US008967337B2

(12) United States Patent
Senecal

(10) Patent No.: US 8,967,337 B2
(45) Date of Patent: Mar. 3, 2015

(54) DEVICE FOR PREVENTING OVERDRAWING OF WINCH HOOK

(75) Inventor: Andre Senecal, Drummondville (CA)

(73) Assignee: Kimpex Inc., Dummondville, QC (CA)

( * ) Notice: Subject to any disclaimer, the term of this patent is extended or adjusted under 35 U.S.C. 154(b) by 377 days.

(21) Appl. No.: 13/182,761

(22) Filed: Jul. 14, 2011

(65) Prior Publication Data

US 2012/0181122 A1 Jul. 19, 2012

Related U.S. Application Data

(60) Provisional application No. 61/364,357, filed on Jul. 14, 2010.

(51) Int. Cl.

*B66D 3/26* (2006.01)
*B66D 1/54* (2006.01)
*F16F 1/373* (2006.01)

(52) U.S. Cl.

CPC ... *B66D 3/26* (2013.01); *B66D 1/54* (2013.01)
USPC ........................... 188/65.1; 267/140; 267/153

(58) Field of Classification Search

USPC ........ 188/65.1–65.2; 267/136, 139, 140, 141, 267/153, 292; 254/270, 277, 323
See application file for complete search history.

(56) References Cited

U.S. PATENT DOCUMENTS

| | | | | |
|---|---|---|---|---|
| 3,556,503 | A * | 1/1971 | van Moss, Jr. | 276/3 |
| 4,053,148 | A * | 10/1977 | Chalmers | 267/201 |
| 5,871,199 | A * | 2/1999 | Koike et al. | 248/638 |
| 2008/0023899 | A1* | 1/2008 | Hasegawa et al. | 267/141.1 |
| 2008/0283720 | A1* | 11/2008 | Sprainis et al. | 248/618 |
| 2011/0001437 | A1* | 1/2011 | Marcaccio et al. | 315/294 |

* cited by examiner

*Primary Examiner* — Anna Momper

(74) *Attorney, Agent, or Firm* — Brouillette & Partners; Robert Brouillette

(57) ABSTRACT

A device for preventing the hook, or a similar attachment element, mounted at the free extremity of a winch cable to contact the winch or associated related structures is disclosed. The device is mounted to the winch cable, typically near or adjacent to the hook and comprises a resilient member or cushion configured to resiliently absorb over-tension in the cable and/or hook when the cable is wound on the shaft of the winch. The device therefore generally prevents damaging contacts between the hook and the winch.

21 Claims, 3 Drawing Sheets

DEVICE FOR PREVENTING OVERDRAWING OF WINCH HOOK

CROSS-REFERENCE TO RELATED APPLICATIONS

The present patent application claims the benefits of priority of U.S. Provisional Patent Application No. 61/364,357, entitled "Device for Preventing Overdrawing of Winch Hook" and filed at the United States Patent and Trademark Office on Jul. 14, 2010, the content of which is incorporated herein by reference.

FIELD OF THE INVENTION

The present invention generally relates to winches and hoists and their related accessories.

BACKGROUND OF THE INVENTION

Winches and hoists are commonly used today. However, one of the problems of winches, and also of hoists, is that it is relatively easy to overdraw the cable and its associated hook/attachment element and therefore to damage the winch.

At the present time, there is no simple solution to the aforementioned and other problems.

There is thus a need for a device which will provide a workable solution to the aforementioned problems.

SUMMARY OF THE INVENTION

In order to at least mitigate the aforementioned and possibly other problems, a device for preventing overdrawing of a winch cable and/or hook in accordance with the principles of the present invention generally comprises a resilient member or cushion configured to be mounted to the winch cable. The resilient member generally prevents the hook, mounted at the free extremity of the cable, from contacting the winch when the cable is overdrawn.

In accordance with the principles of the present invention, the resilient member is generally made from elastomeric material and generally comprises a relatively central opening extending therethrough for receiving the cable.

According to one aspect of the present invention, the resilient member comprises a central portion intermediate the first end portion and the second end portion, and wherein the central portion defines a waist, wherein the waist is of reduced diameter and is more compressible than at least one of the two end portions.

The device typically further comprises two end caps respectively mounted at each extremity of the resilient member. The end caps are generally, though not necessarily, made from metallic material and generally comprise a relatively central opening extending therethrough and configured to be substantially aligned or coextensive with the opening of the resilient member for receiving the winch cable. It is to be noted that the end caps may be made from non-metallic material such as polymer or composite, for example, that are hard enough or resistant enough to support the forces or pressures applied on them.

According to one aspect of the present invention, the inner side of at least one end cap of the device comprises an axially extending sleeve extending inwardly toward the resilient member wherein the inwardly extending sleeve is frictionally received into the central opening of the resilient member and wherein the outer surface of the sleeve is provided with at least one circumferentially extending protrusion or rib frictionally engaging the inner surface of the central opening.

The resilient member and the two end caps are each provided with a side or lateral slot extending from their respective periphery all the way to their respective central opening. The lateral slots allow the cable of the winch to be laterally inserted into (or extracted from) the device without removing the hook from the cable. However, during use, the slots, which are not aligned, generally prevent the cable from accidentally exiting the device.

The resilient member according to one aspect of the present invention typically comprises a first opening that has a central longitudinal axis, wherein the first lateral slot define a plane bisecting the central axis of the first opening.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel device for preventing overdrawing of winch hook will be described hereinafter. Although the invention is described in terms of specific illustrative embodiments, it is to be understood that the embodiments described herein are by way of example only and that the scope of the invention is not intended to be limited thereby.

Figure 1:
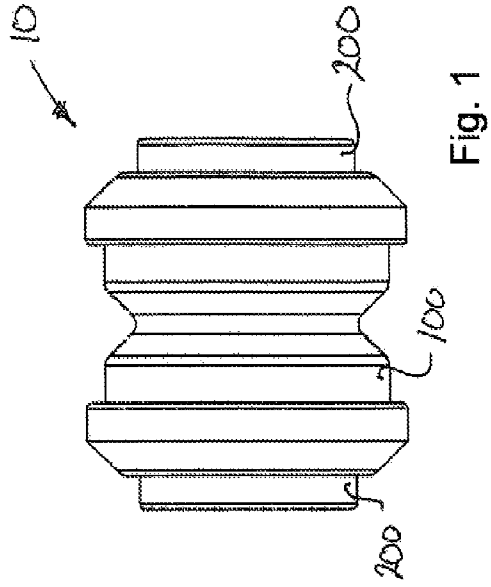
FIG. 1 is a side view of an exemplary winch hook overdrawing prevention device in accordance with the principles of the present invention.
Figure 3:
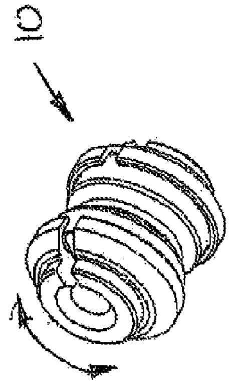
FIG. 3 is a perspective view of the device of FIG. 1.
Figure 2:
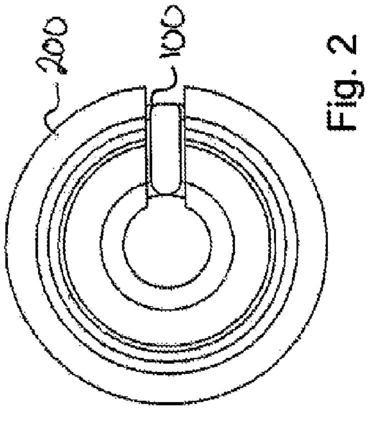
FIG. 2 is an end view of the device of FIG. 1.
Figure 4:
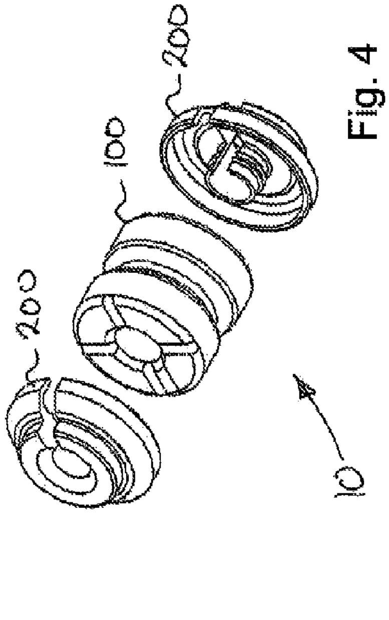
FIG. 4 is an exploded perspective view of the device of FIG. 1.

Referring first to FIGS. 1, 3 and 4, an exemplary device 10 in accordance with the principles of the present invention is illustrated. The device 10 is configured to be mounted to the cable (not shown) of a winch (not shown), preferably near or adjacent to the hook (not shown) mounted at the free extremity of the cable. Referring particularly to FIG. 4, the device 10 comprises a main resilient member (or cushion) 100 and generally two end caps 200. When the device 10 is mounted to a cable, the resilient member 100 acts as a resilient cushion between the hook, or other similar attachment element such as ring, coupler, clamp, etc., and the winch such as to resiliently absorb over-tension in the cable and/or hook when the cable is wound on the shaft of the winch. The device 10 therefore generally prevents damaging contacts between the hook and the winch when the cable is overdrawn.

Referring now to FIGS. 5 to 8, the resilient member 100 is depicted in more details. In the present embodiment, the resilient member 100 is substantially of cylindrical configuration and generally comprises a first end portion 110, a second end portion 130, and an intermediate or central portion 150. The resilient member 100 is preferably made from elastomeric material such as to be able to resiliently deform when the cable is overdrawn.

Figure 6:
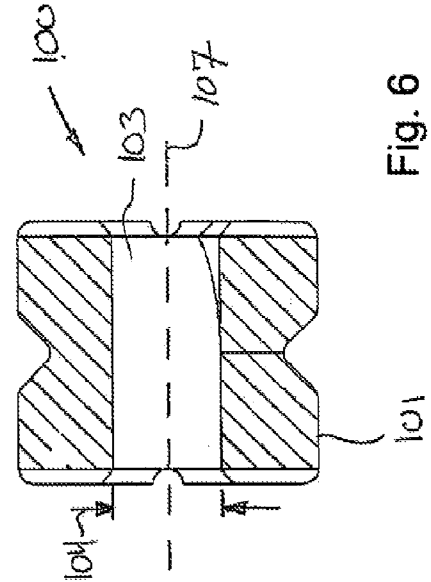
FIG. 6 is a cross-sectional side view of the resilient member of FIG. 5, along lines A-A in FIG. 5.
Figure 7:
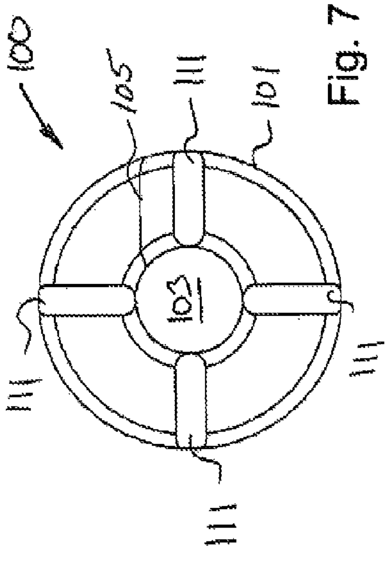
FIG. 7 is an end view of the resilient member of FIG. 5.
Figure 8:
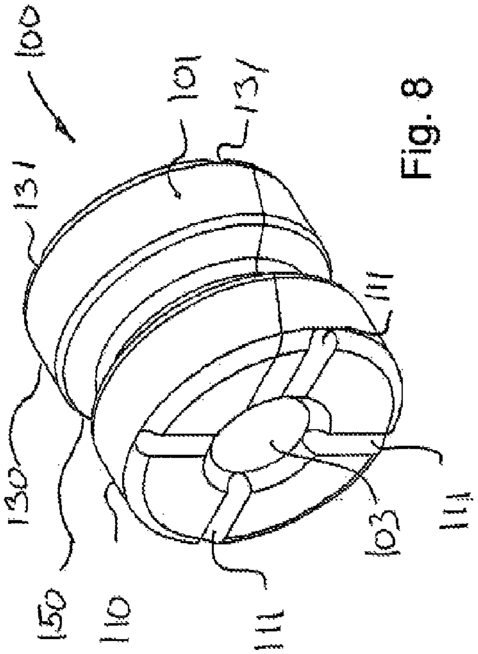
FIG. 8 is a perspective view of the resilient member of FIG. 5.

As shown in FIGS. 6 to 8, the resilient member 100 comprises a peripheral surface 101 and an opening 103 extending therethrough (see FIG. 6). The opening 103 allows the cable of the winch to extend through the device 10. In that sense, it is preferable that the diameter 104 of the opening 103 be at least slightly larger than the diameter of the cable such as to allow the device 10 to slide or move more or less freely along the cable.

The two end portions 110 and 130 of the resilient member 100 are configured to receive the end caps 200 which will be described in more details below. As shown in FIGS. 7 and 8, the end portions 110 and 130 are each provided with radially extending grooves 111 and 131.

Figure 5:
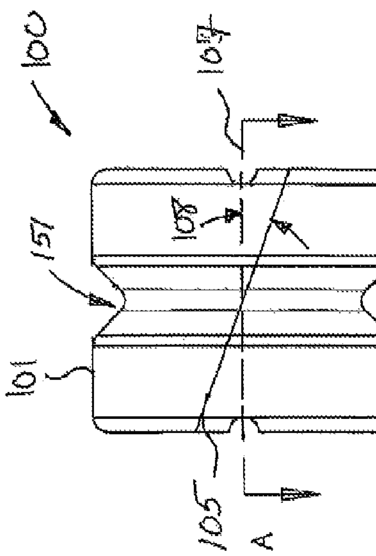
FIG. 5 is a side view of the resilient member of the device of FIG. 1.

For its part, as best shown in FIGS. 5 and 6, the central portion 150 generally defines a waist 151 of reduced dimensions or reduced diameter. Being of reduced diameter, the waist 151 of the central portion 150 is more easily compressed than the two end portions 110 and 130. Hence, the waist 151 allows the resilient member 100 to deform more easily when the cable is overdrawn.

The resilient member 100 further comprises a laterally extending slot 105 extending all the way from the peripheral surface 101 to the central opening 103 (best shown in FIG. 7). The slot 105 allows the resilient member 100 to open during installation to allow the cable of the winch to be laterally inserted into the central opening 103. Preferably, but not necessarily, as best shown in FIG. 5, the slot 105 extends at an angle (angle 108 in FIG. 5) with respect to the longitudinal axis 107 of the resilient member 100. The angular orientation of the side slot 105 generally prevents the cable from accidentally exiting the central opening 103 during use.

Even though in the present embodiment, the resilient member 100 is unitary, in other embodiments, the resilient member 100 could be made of several portions mounted, connected and/or fastened together. The resilient member 100 could also be made of portions of different hardness or of different materials.

Figure 10:
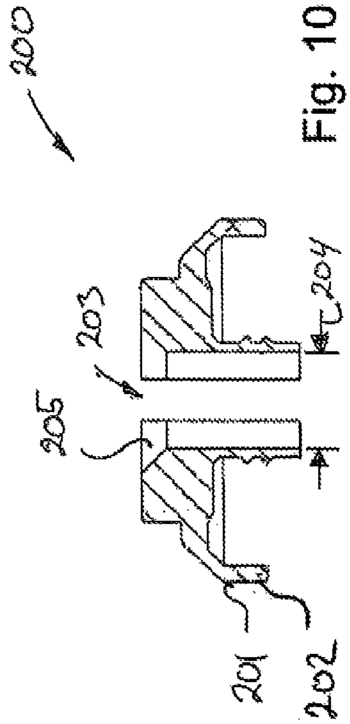
FIG. 10 is a cross-sectional side view of the end cap of FIG. 9, along lines A-A in FIG. 9.
Figure 9:
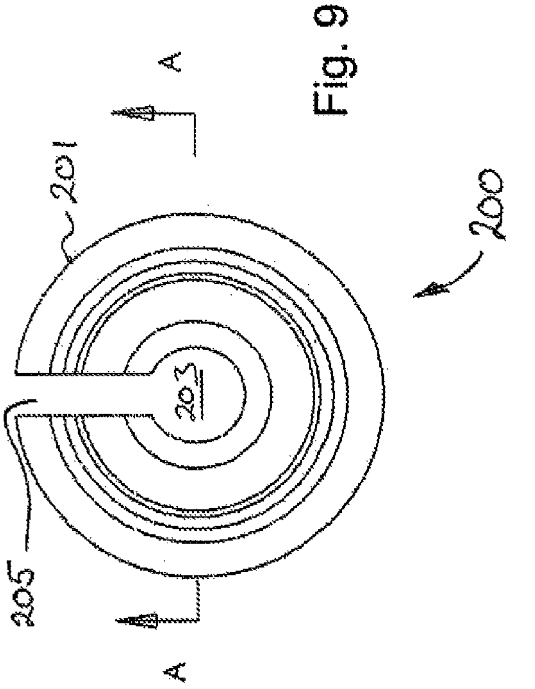
FIG. 9 is an end view of the one of the end caps of the device of FIG. 1.
Figure 11:
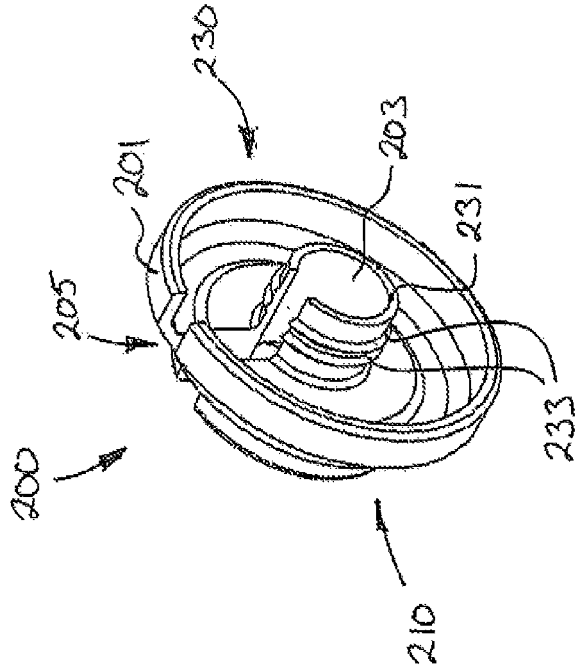
FIG. 11 is a perspective view of the end cap of FIG. 9.

Referring now to FIGS. 9 to 11, one of the end caps 200 is shown in more details. As explained above, in the present embodiment, the device 10 comprises two end caps 200. As the two end caps are essentially identical, only one end cap 200 will be described.

In the present embodiment, the end cap 200 is generally of circular configuration to match the cylindrical configuration of the resilient member 100, and comprises a peripheral surface or rim 201 and a central opening 203. As for the central opening 103, the central opening 203 is also configured to receive the cable. In that sense, the central openings 203 of the end caps 200 are generally aligned with the opening 103 of the resilient member 100 when they are mounted thereto (see FIGS. 3 and 4). Also, the diameter 204 of the opening 203 is preferably slightly larger than the diameter of the cable.

As best shown in FIG. 10, the outermost extremity 205 of the opening 203 preferably flares. This flared portion of the opening 203 generally defines a stress-relief zone allowing the cable to bend without excessive stress.

Referring to FIGS. 10 and 11, the end cap 200 generally comprises an outer side 210 and an inner side 230.

In the present embodiment, the inner side 230 of the end cap 200 comprises an axially extending sleeve 231 extending inwardly toward the resilient member 100. The sleeve 231 is configured to be frictionally received into the central opening 103 of the resilient member 100. In that sense, in the present embodiment, the outer surface of the sleeve 231 is provided with one or more circumferentially extending protrusions or ribs 233 configured to frictionally engage the inner surface of the central opening 103. Understandably, the sleeve 231 could be provided with other configurations of engaging or elements such as, but not limited to, axially extending ribs.

To install the device 10 on the cable, the end caps 200 and the resilient member 100 are inserted one by one on the cable and then the end caps 200 are pressed inside the resilient member 100.

Having the slot 105 at an angle 108 prevents the slots 205 of the end caps 200 and the slot 105 of the resilient member 100 to be aligned. This generally prevents the cable from getting out of the device 10 accidentally.

Due to the presence of the axially extending flange portion 202 of the peripheral rim 201, the end caps 200 also prevent the resilient member 100 to open under pressure. Indeed, since each the flange portions 202 of the peripheral rim 201 covers or circumscribes an annular portion of the resilient member 100, near the extremities thereof, this generally prevents the resilient member 100 to open along the slot 105.

To insert the resilient member 100 on the cable or to slide a cable in the slot 105, the end caps 200 must not be installed on the resilient member 100 as shown in FIG. 1. Indeed, when the end caps 200 are connected on the resilient member 100 as shown in FIG. 1, it is generally not possible for the resilient member 100 to open along the slot 105 due to the flange portions 202.

Once the resilient member 100 is properly mounted to the cable, the end caps 200 are then mounted to the resilient member 100 by pressing the sleeves 231 into the opening 103. The device 10 is then ready to be use.

In use, the device 10 will typically be located adjacent or near the hook mounted at the free extremity of the cable. Then, when the cable is wound back into the winch, the device 10 will typically prevent the hook from contacting the winch if the cable is overdrawn, thereby preventing possible damages.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A device for preventing overdrawing of a winch hook mounted to a cable, the device comprising:

a. a resilient member comprising an opening therethrough for receiving the cable, the resilient member comprising a lateral slot extending between a periphery of the resilient member and the opening, and b. two end caps, each of the end caps being removably mounted to an extremity of the resilient member, each of the end caps comprising an opening therethrough configured to be substantially coextensive with the opening of the resilient member when mounted thereto;

wherein the resilient member comprises a central portion intermediate the first end portion and the second end portion, and wherein the central portion defines a waist, the waist being of reduced diameter and being more compressible than at least one of the two end portions.

2. A device as claimed in claim 1, wherein the resilient member is made of elastomeric material.

3. A device as claimed in claim 1, wherein the end caps are made from metallic material.

4. A device as claimed in claim 1, wherein the first opening has a central longitudinal axis, wherein the first lateral slot define a plane bisecting the central axis of the first opening.

5. A device as claimed in claim 1, wherein the inner side of at least one end cap comprises an axially extending sleeve extending inwardly toward the resilient member wherein the inwardly extending sleeve is frictionally received into the central opening of the resilient member and wherein the outer surface of the sleeve is provided with at least one circumferentially extending protrusion or rib frictionally engaging the inner surface of the central opening.

6. A device for preventing overdrawing of a winch attachment element mounted at a free extremity of a cable of a winch, the device comprising:

a. a resilient member comprising a first peripheral surface, a first end portion and a second opposite end portion, the resilient member comprising a first opening extending therethrough for receiving the cable of the winch and a first lateral slot extending between the first peripheral surface and the first opening;

b. a first end cap secured to the first end portion of the resilient member, the first end cap comprising a second peripheral surface, a second opening extending therethrough for receiving the cable of the winch, and a second lateral slot extending between the second peripheral surface and the second opening;

c. a second end cap secured to the second end portion of the resilient member, the second end cap comprising a third peripheral surface, a third opening extending therethrough for receiving the cable of the winch, and a third lateral slot extending between the third peripheral surface and the third opening; and wherein the first opening has a central longitudinal axis, and wherein the first lateral slot define a plane bisecting the central axis of the first opening.

7. A device as claimed in claim 6, wherein the resilient member comprises a central portion intermediate the first end portion and the second end portion, and wherein the central portion defines a waist, wherein the waist is of reduced diameter is more compressible than at least one of the two end portions.

8. A device as claimed in claim 6, wherein the resilient member is made of elastomeric material.

9. A device as claimed in claim 6, wherein the inner side of at least one end cap comprises an axially extending sleeve extending inwardly toward the resilient member wherein the inwardly extending sleeve is frictionally received into the central opening of the resilient member and wherein the outer surface of the sleeve is provided with at least one circumferentially extending protrusion or rib frictionally engaging the inner surface of the central opening.

10. A device as claimed in claim 9, wherein each of the sleeves comprises at least one protrusion for frictionally engaging the inner surface of the first opening.

11. A device as claimed in claim 6, wherein the first and second end caps are each made from metallic material.

12. A device as claimed in claim 6, wherein the winch attachment element is a winch hook.

13. A device for preventing overdrawing of a winch attachment element mounted at a free extremity of a cable of a winch, the device comprising:

a. a resilient member comprising a first end portion and a second end portion, the resilient member defining a first peripheral surface, the resilient member comprising a first opening extending therethrough defining an inner surface for receiving the cable of the winch and a first lateral slot extending between the first peripheral surface and the first opening;

b. a pair of end caps respectively engaged the first end portion and the second end portion of the resilient member, each of the end caps comprising an outer side, an inner side, and a peripheral rim comprising a flange portion, each of the end caps comprising a second opening extending therethrough for receiving the cable of the winch, and a second lateral slot extending between the peripheral rim and the second opening;

wherein the inner side of at least one end cap comprises an axially extending sleeve extending inwardly toward the resilient member wherein the inwardly extending sleeve is frictionally received into the central opening of the resilient member, wherein the inwardly extending sleeve has an inner surface and an outer surface and wherein the outer surface of the sleeve is provided with at least one circumferentially extending protrusion or rub frictionally engaging the inner surface of the central opening.

14. A device as claimed in claim 13, wherein the resilient member comprises a central portion intermediate the first end portion and the second end portion, and wherein the central portion defines a waist, wherein the waist is of reduced diameter and is more compressible than at least one of the two end portions.

15. A device as claimed in claim 13, wherein the first opening has a central longitudinal axis, and wherein the first lateral slot define a plane bisecting the central axis of the first opening.

16. A device as claimed in claim 13, wherein the resilient member is made from elastomeric material.

17. A device as claimed in claim 13, wherein each of the end caps comprises, on the inner side thereof, an outwardly extending sleeve configured to frictionally engage an inner surface of the first opening.

18. A device as claimed in claim 17, wherein each of the sleeves comprises at least one protrusion for frictionally engaging the inner surface of the first opening.

19. A device as claimed in claim 13, wherein each of the flange portions is configured to at least partially circumscribe a portion of one of the first and second end portions of the resilient member.

20. A device as claimed in claim 13, wherein the end caps are each made from metallic material.

21. A device as claimed in claim 13, wherein the winch attachment element is a winch hook.

* * * * *